Patented Oct. 19, 1943

2,332,241

UNITED STATES PATENT OFFICE 2,332,241

GRINDING WHEEL

Robert H. Lombard and Lowell H. Milligan, Worcester, Mass., assignors to Norton Company, Worcester, Mass., a corporation of Massachusetts No Drawing. Application December 6, 1941, Serial No. 421,956

7 Claims. (Cl. 51—308)

The invention relates to grinding wheels and other solid abrasive bodies and compositions, and with regard to its more specific features to grinding wheels comprising silicon carbide abrasive bonded by a vitrified bond, but the invention also particularly applies to abrasive compositions comprising other carbide abrasives or oxidizable abrasives including diamonds.

One object of the invention is to provide an inorganic vitrifiable bond for silicon carbide or the like maturing at cone 12 in air. Another object of the invention is to avoid special burning temperatures and/or an inert atmosphere, yet to produce a strong abrasive composition comprising silicon carbide or the like bonded with a glassy bond. Another object of the invention is to provide an inorganic vitrifiable mix of relatively low reactivity toward silicon carbide in a cone 12 burn in air. Another object of the invention is to provide an inorganic vitrifiable bond which when softened sufficiently for good bonding has good wettability toward silicon carbide grains and adheres thereto strongly.

Another object of the invention is to provide a grinding wheel or other abrasive composition of higher modulus of elasticity than can be obtained by porcelanic types of bond. Another object of the invention is to obtain a higher modulus of elasticity and stronger bonding in a vitrified bonded silicon carbide wheel than can be obtained by any porcelanic type of bond. Another object of the invention is to increase the grinding efficiency of a silicon carbide grinding wheel or other solid abrasive body. Another object of the invention is to permit the manufacture of extremely dense, hard, unswelled products made of silicon carbide bonded with vitrified bond, which products cannot now be made using the present porcelanic types of bond.

Another object of the invention is to provide a bond usable in substantially the entire range of medium and hard grade structures in silicon carbide vitrified bonded grinding wheels. Another object of the invention is to provide a type of bond which under certain conditions can be employed for bonding of diamonds.

Another object of the invention is to provide a fluid bond (i. e., one that becomes softer than the porcelanic bonds during the kiln firing) having substantially less reactivity toward silicon carbide than a bond of equal fluidity that includes a large amount of the alkali fluxes. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the preferred form of the invention, we provide a quantity of silicon carbide abrasive. This may be either of the black variety or the purer green variety, or any other type. Speaking commercially, the other carbides are not at present used to any appreciable extent for the manufacture of grinding wheels or other vitrified bonded products; nevertheless when and if some such carbides, such as boron carbide, titanium carbide, tungsten carbide, tantalum carbide, and the like, become useful for these purposes, they may be used in this invention. Diamonds, however, are now used to a great extent in the manufacture of grinding wheels in industry and certain features of the invention may have application to the bonding of diamonds. However, care would have to be taken that the temperature should not be raised so high for so long a time that the diamonds would be graphitized or burned. Accordingly the invention will be described particularly in connection with the bonding of silicon carbide.

In one preferred form of the invention we provide a batch composition as follows:

Batch composition

| | Parts by weight |
|---|---|
| Kentucky No. 6 clay (Ball Clay) | 22.73 |
| Ground flint (SiO$_2$) | 18.96 |
| Artificial colemanite (2CaO.3B$_2$O$_3$) | 21.81 |
| Spodumene ore | 29.09 |
| Zircon (ZrSiO$_4$) | 7.41 |
| Silicon powder | 5.00 |
| Aluminum powder | 4.00 |
| | 109.00 |

One of the functions performed by the Kentucky No. 5 clay is to aid in obtaining a mixture that is readily moldable in the raw state. Another function is to contribute silica, alumina, and minor amounts of other constituents to the vitrified bond. A major function of the ground flint is to contribute silica to the bond composition. Silica is an acidic constituent and aids in the formation of glass having the desired composition and physical properties.

A function performed by the artificial colemanite is to contribute calcium oxide and boric oxide, which are fluxing ingredients, to the glass composition. This artificial colemanite is made in the form of a relatively insoluble fused product which has then been allowed to solidify and is then reduced to powdered form. Other sources of calcium and boric oxide suitable for performing these functions might be employed.

A function of the spodumene ore is to contribute silica and alumina together with the fluxes, lithium oxide, sodium oxide, and potassium oxide. It also introduces minor amounts of impurities. This is in non-plastic form, as is usual for most of the constituents with the exception of clay. Other sources of these constituents having similar characteristics might be employed. One reason for using spodumene is to obtain a source of lithium oxide. A function of the zircon is to contribute silica and zirconia to the bond mixture. This is a convenient source of zirconia, although other sources might be employed.

Silicon powder and aluminum powder are incorporated in the bond mixture as "protective agents." They represent materials that are oxidized readily at high temperatures to relatively non-basic oxides and keep oxygen away from oxidizable abrasive grains, as well as aiding in the elimination of blebs in the bond glass. In the final bond they may exist either in their original form as unoxidized particles of silicon and aluminum which ordinarily do not contribute appreciably to the composition of the bond glass, or they may to some extent be oxidized to silica and alumina which may then become constituents of the bond glass. Since the degree to which the silicon and aluminum powders are converted to oxides may vary in different products, and therefore silica and alumina may be contributed to the bond in somewhat variable amounts, we have chosen to base the discussion of bond compositions on the total constituents exclusive of abrasive grains, and including the total silica plus silicon calculated as $SiO_2$, and the total alumina plus aluminum calculated as $Al_2O_3$.

Titania, $TiO_2$, may be substituted in part or in whole for zirconia, $ZrO_2$, in the chemical composition of a bond according to our invention, and the batch composition altered accordingly.

Powdered prefused glasses or frits may be used as bonds or bond constituents to provide bond glasses having chemical compositions within the scope of our invention. For example, we might prepare a glass or frit by fusing together flint, artificial colemanite, spodumene ore, and zircon in the proportions of the above batch; and then form a bond by mixing:

| | Parts by weight |
|---|---|
| Kentucky No. 6 clay | 22.73 |
| Above frit | 77.27 |
| Silicon powder | 5.00 |
| Aluminum powder | 4.00 |

Bonds comprising frits homogenize to a glass in a much shorter time at the firing temperature than do bonds made from the equivalent raw materials. In the case of diamond abrasive grains, the use of frit-containing bonds enables one to curtail the time of exposure of the diamond to oxidizing conditions, or to temperatures at which graphitization tends to occur.

The batch composition above given when fused has the following calculated chemical composition:

*Chemical composition*

| | Not including silicon and aluminum powders | Including silicon and aluminum powders as silica and alumina |
|---|---|---|
| | Per cent | Per cent |
| $SiO_2$ | 59.85 | 59.63 |
| $TiO_2$ | 0.61 | .52 |
| $ZrO_2$ | 4.92 | 4.14 |
| $Al_2O_3$ | 9.58 | 14.56 |
| $Fe_2O_3$ | 0.34 | .31 |
| MgO | 0.03 | .02 |
| CaO | 7.87 | 6.63 |
| $Li_2O$ | 0.59 | .50 |
| $Na_2O$ | 0.94 | .80 |
| $K_2O$ | 0.79 | .68 |
| $B_2O_3$ | 14.48 | 12.21 |
| | 100.00 | 100.00 |

We form a moist granular mix in the usual way. That is to say, taking a quantity of silicon carbide abrasive, we first wet it with water, then add the various ingredients of the batch composition in powdered form together with a suitable amount of temporary binder, such as dextrine. We then mix thoroughly, thus coating each granule with a quantity of the batch composition.

We then spread a quantity of the moist granular mix in a suitable mold, press to produce the desired porosity, strip the "green" wheel or other product from the mold, dry it, and place it in a regular cone 12 kiln. Tunnel kilns are now preferred in industry for the manufacture of vitrified grinding wheels for the reason that conditions can be controlled and the operation is continuous. Conditions of firing defined as cone 12 are well known. A given cone number in the ceramic industry represents a function of both time and temperature, as is well known. With slow firing, cone 12 may be considered to be in the general range from about 1250° C. to about 1300° C. This, of course, can be varied by heating to a higher temperature for a shorter time or to a lower temperature for a longer time. The atmosphere in the kilns is air, as is well known. However, the products made by this invention are not limited to those fired at cone 12.

The resultant product is a grinding wheel or the like consisting of silicon carbide abrasive bonded with an aluminoborosilicate glass of low alkali oxide content, including in its chemical composition the combination alkaline earth oxides and zirconia and/or titania. A certain amount of oxidation products of protective agents such as aluminum and silicon as well as probably some of the unoxidized protective agents themselves, may also be present.

On the surface of the product during the burn there is likely to be a slight reaction between the bond and the silicon carbide grain and the air which produces a thin zone containing vesicular bond glass on the surface. This surface zone of reaction can readily be removed by truing and the remainder of the wheel shows no objectionable reactivity or swelling. This glassy surface tends to protect the interior of the wheel against further reaction and is produced to the greatest extent on medium and hard grade wheel structures. The bond, therefore, is best suited for use in structures where porosity and permeability are relatively low and free access of air to the interior of the wheel structure is impeded.

The aluminum and silicon protect the carbide from detrimental reaction with the bond in the presence of a certain amount of air. However, in place of the combination, either one can be used alone, or other suitable, readily oxidizable, moderately refractory solid material in powdered form could be substituted.

The combination of low alkali metal oxide content together with alkaline earth oxide and zirconia and/or titania is a feature of the present invention. It has been found particularly advantageous to have lithia present among the alkaline oxides, since this acts as a flux like soda and potash, but appears to be less reactive in our compositions. The alkaline earths such as lime and magnesia are in general less basic chemically and constitute less active ceramic fluxes than the alkali oxides. Silicon carbide at cone 12 heat is acidic. Silica is acidic. If too much alkali oxide is present in proportion to the acidic silica, undesirable reactions occur. Zirconia may be considered to be only slightly basic. The specific functions of each of the constituents of the novel combination of oxides as just given, has not been worked out in complete detail but we know that this combination is preferable to the use of the ordinary alkali oxides alone as fluxes and permits the attainment of the objects heretofore given. Swelling and coring of the product and crazing of the bond glass were difficulties to be overcome in developing a hard wheel bonded with glassy bond.

In carrying out the invention, it is preferred that the silica does not exceed 70 per cent and does not drop much below 40 per cent, in the final composition of the abrasive article exclusive of the abrasive itself. It is preferred that zirconia and/or titania be present between 2 per cent and 20 per cent. Alumina is more or less neutral ceramically at cone 12 burning. Alumina, however, is itself of a refractory nature and the amount that is present should probably not exceed 30 per cent. Iron oxide may be zero and it is preferred that it be below 3 per cent. It is preferred that the alkaline earth oxides be present in the range 2 per cent to fifteen per cent, and of this the magnesia content may even be zero. The total alkali oxide content should preferably be between 0.5 per cent and 5 per cent. Of this, soda and potash are usually present, and it is also preferred that lithia be present within the range of from 0.3 per cent to 3 per cent. The preferred range for boric oxide is between 5 per cent and 25 per cent.

The invention also contemplates a silicate frit embodying the features of the novel combination of the ingredients and between the limits specified for use as part of the bond in silicon carbide abrasive where, for example, ball clay is a considerable constituent of the bond and a frit is used to provide a fluid component at reasonably low temperatures or otherwise. Thus the invention may be embodied in a modified porcelanic bonded silicon carbide wheel where the use of a frit made in accordance with this invention promotes wetting of the abrasive grains by the bond without detrimental reactivity and otherwise completely or partially achieves the objects of the invention.

It will thus be seen that there has been provided by this invention an article and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

1. An abrasive article comprising oxidizable abrasive grains bonded with a vitrified borosilicate bond including from 40 to 70 per cent silica, from 2 to 20 per cent of oxide selected from the group consisting of zirconia and titania, not more than 30 per cent of alumina, from 2 to 15 per cent of alkaline earth oxide, from 5 to 25% of boron oxide and from 0.5 to 5 per cent of alkali metal oxide, all percentages being by weight on the entire vitrified bond.

2. An abrasive article comprising silicon carbide abrasive grains bonded with a vitrified borosilicate bond including from 40 to 70 per cent of silica, from 2 to 20 per cent of oxide selected from the group consisting of zirconia and titania, not more than 30 per cent of alumina, from 2 to 15 per cent of alkaline earth oxide including not more than 6 per cent of magnesia, from 5 to 25% of boron oxide and from 0.5 to 5 per cent of alkali metal oxide, all percentages being by weight on the entire vitrified bond.

3. An abrasive article comprising oxidizable abrasive grains bonded with a vitrified borosilicate bond including between 40 and 70 per cent silica, at least 2 per cent of zirconia, at least 2 per cent of alkaline earth oxide, and at least 5 per cent of boric oxide.

4. An abrasive article comprising silicon carbide abrasive grains bonded with a vitrified borosilicate bond including from 40 to 70 per cent silica, from 2 to 20 per cent of zirconia, not more than 30 per cent of alumina, not more than 3 per cent of iron oxide, from 2 to 15 per cent of alkaline earth oxide with not more than 6 per cent of magnesia, from 0.5 to 5 per cent of alkali metal oxide, and from 5 to 25 per cent of boric oxide.

5. An abrasive article comprising oxidizable abrasive grains bonded with a vitrified borosilicate bond including from 40 to 70 per cent silica, from 2 to 20 per cent of oxide selected from the group consisting of zirconia and titania, not more than 30 per cent of alumina, from 2 to 15 per cent of alkaline earth oxide, from 5 to 25% of boron oxide and from 0.5 to 5 per cent of alkali metal oxide which contains from 0.3 to 3 per cent of lithia, all percentages being by weight of the entire vitrified bond.

6. An abrasive article comprising silicon carbide abrasive grains bonded with a vitrified borosilicate bond including from 40 to 70 per cent of silicon, from 2 to 20 per cent of oxide selected from the group consisting of zirconia and titania, not more than 30 per cent of alumina, from 2 to 15 per cent of alkaline earth oxide including not more than 6 per cent of magnesia, from 5 to 25% of boron oxide and from 0.5 to 5 per cent of alkali metal oxide which contains from 0.3 to 3 per cent of lithia, all percentages being by weight of the entire vitrified bond.

7. An abrasive article comprising silicon carbide abrasive grains bonded with a vitrified borosilicate bond including from 40 to 70 per cent silica, from 2 to 20 per cent of zirconia, not more than 30 per cent of alumina, not more than 3 per cent of iron oxide, from 2 to 15 per cent of alkaline earth oxide with not more than 6 per cent of magnesia, from 0.5 to 5 per cent of alkali metal oxide, and from 5 to 25 per cent of boric oxide, said alkali metal oxide containing from 0.3 to 3 per cent of lithia, all percentages being by weight of the entire vitrified bond.

ROBERT H. LOMBARD.
LOWELL H. MILLIGAN.